T. SHEHAN.
DEVICE FOR CUTTING SCREW THREADS.
APPLICATION FILED JUNE 21, 1917.

1,265,821.

Patented May 14, 1918.
3 SHEETS—SHEET 1.

Witnesses.

Inventor.
Thomas Shehan
By _____________
his Attorney.

T. SHEHAN.
DEVICE FOR CUTTING SCREW THREADS.
APPLICATION FILED JUNE 21, 1917.

1,265,821.

Patented May 14, 1918.
3 SHEETS—SHEET 2.

Witnesses

Inventor
Thomas Shehan
By his Attorney.

UNITED STATES PATENT OFFICE.

THOMAS SHEHAN, OF CLEVELAND, OHIO.

DEVICE FOR CUTTING SCREW-THREADS.

1,265,821.

Specification of Letters Patent.  Patented May 14, 1918.

Application filed June 21, 1917. Serial No. 176,073.

*To all whom it may concern:*

Be it known that I, THOMAS SHEHAN, a citizen of the United States of America, residing at Cleveland, in the county of Cuyahoga and State of Ohio, having invented certain new and useful Improvements in Devices for Cutting Screw-Threads; and I hereby declare the following to be a full, clear, and exact description of the invention, such as will enable others skilled in the art to which it pertains to make and use the same.

This invention relates to improvements in devices for cutting screw-threads, and pertains more especially to a screw-cutter or device for cutting external screw-threads and comprising a cutter-head which has a centrally located bore extending endwise or longitudinally of the cutter-head and is provided in its forward portion with radially arranged guideways which are spaced circumferentially of said bore and engaged by cutters adapted for cutting screw-threads.

One object of this invention is to provide a screw-thread-cutting device of the character indicated with improved simple, durable and reliable means for shifting or adjusting the cutters simultaneously.

Another object is to provide improved means whereby the cutters, upon having completed their cutting operation on the object to be screw-threaded, are simultaneously and correspondingly withdrawn from the work.

Another object is to provide means whereby the cutters, when they are in position for cutting a screw-thread, can be readily simultaneously and correspondingly readjusted for making a deeper or shallower cut.

Another object is to facilitate the making and assembling of the component parts of my improved screw-thread-cutting device and to render said device reliable in its operation and not liable to get out of order.

With these objects in view, and to attain any other object hereinafter appearing, this invention consists in certain features of construction, and combinations and relative arrangement of parts, hereinafter described in this specification, pointed out in the claims, and illustrated in the accompanying drawings.

In said drawings.

Figure 1:
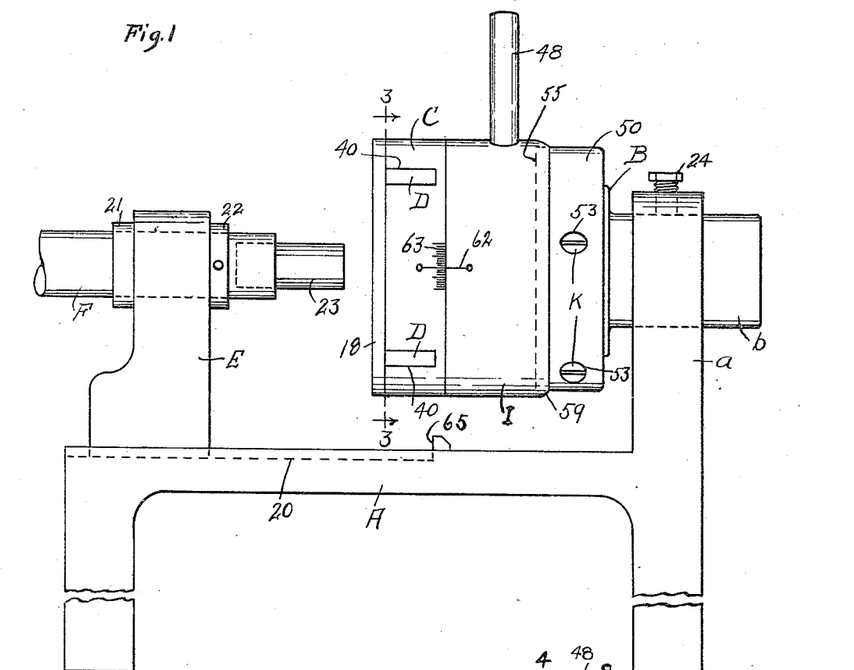
Figure 1 is a side view of a portion of a machine provided with my improved device for cutting screw-threads, and shows the object or work which is to be externally screw-threaded by said device.
Figure 2:
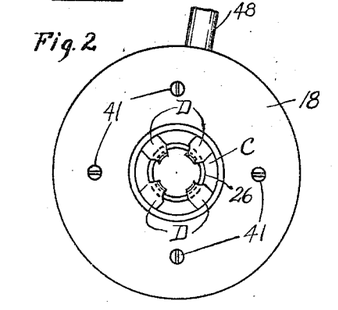
Fig. 2 is a forward end view of said screw-thread-cutting device.
Figure 4:
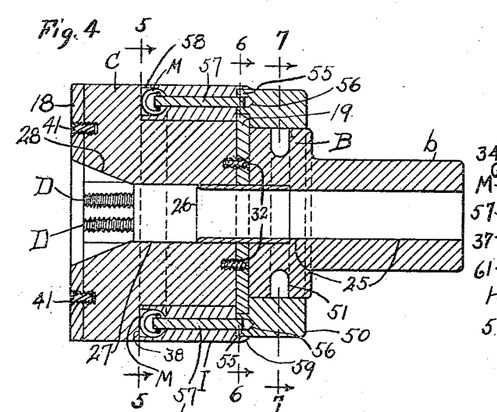
Fig. 4 is a central longitudinal vertical section taken along the line 4—4, Fig. 3, looking in the direction indicated by the arrow.
Figure 5:
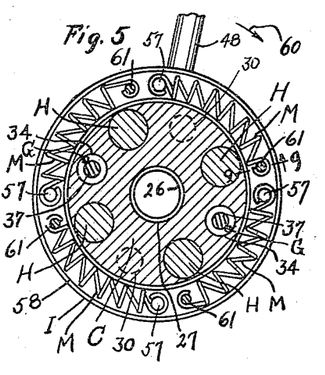
Fig. 5 is a transverse vertical section taken along the line 5—5, Fig. 4, looking rearwardly.

Referring to Fig. 1 of the drawings, A indicates the bed of a machine provided with an upright standard *a* from which my improved screw-thread-cutting device is supported. Said device for cutting screw-threads comprises a circular stock having a circular stationary inner portion or body B. Said screw-thread-cutting device also comprises a cutter-head having a circular portion or body C interposed between two parallel circular end-plates 18 and 19 which (see Fig. 4) form the forward end face and rear end face respectively of the cutter-head, and D indicates the cutters of the cutter-head. A work-feeding head E (see Fig. 1) is shown engaging a slideway 20 formed in the bed A, and said slideway is arranged as required to enable said head to be moved toward and from the screw-thread-cutting device. F indicates a horizontally arranged spindle which has bearing in the head E and is parallel with the slideway 20 and provided with two collars 21 and 22 arranged to prevent endwise movement of the spindle in opposite directions independently of said head. Said spindle is suitably rotated, and the head E is shifted endwise of the slideway 20 in any approved manner so as to shift the spindle endwise during its rotation. Means for rotating a spindle while the spindle is being shifted endwise are too well known in the art to require illustration and description in this specification. Suffice it to state that said spindle is employed as a work-holder, and 23, Fig. 1, indicates the work, such, for instance, as a rod, screw-blank or other object, which is carried by the spindle and arranged to be operated on externally by the cutters D during the feeding of the work the extent required.

Figure 8:
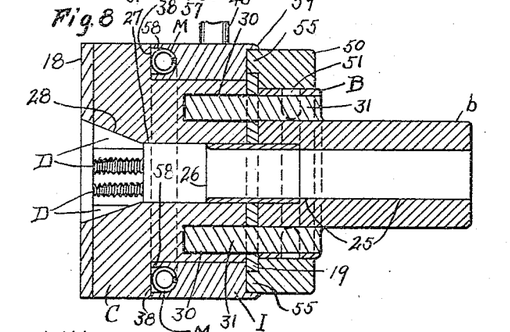
Fig. 8 is a longitudinal section taken along the line 8—8, Fig. 3, looking in the direction indicated by the arrow.
Figure 10:
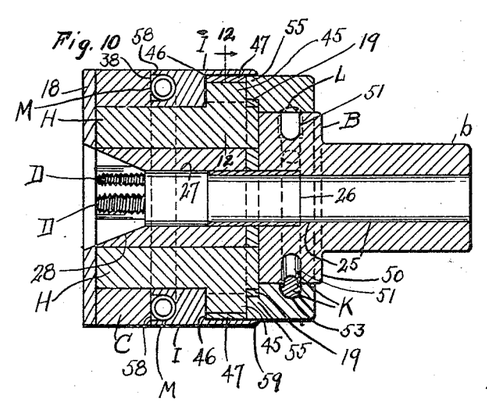
Fig. 10 is a longitudinal section taken along the line 10—10, Fig. 3, looking in the direction indicated by the arrow.

The body B of the stock is provided centrally with a rearwardly projecting horizontally arranged arm $b$ which is shown in Fig. 1 as extending into and supported from the standard $a$ to which said arm is secured by a set-screw 24. Said body B (see Figs. 4, 8 and 10) is provided centrally with a horizontally arranged bore 25 which extends endwise of and through the stock. The body B of the stock is provided at and centrally of its forward end with a forwardly projecting substantially horizontal tubular member 26 which is circular in cross-section and shown arranged in line endwise with the arm $b$.

The rearward portion of the cutter-head loosely embraces the tubular member 26 of the body B of the stock, and the cutter-head extends forwardly of said tubular member. The cutter-head is annular and therefore provided centrally (see Figs. 4, 5, 8 and 10) with a circular bore 27 which extends rearwardly in a substantially horizontal direction from the forward end of the cutter-head and preferably endwise through the cutter-head; and the rear portion of the surrounding wall of said bore surrounds the tubular member 26 of the stock, and said bores 26 and 27 are arranged in line endwise. The forward portion of the bore 27 preferably flares, as at 28, toward the forward end of the cutter-head.

Figure 3:
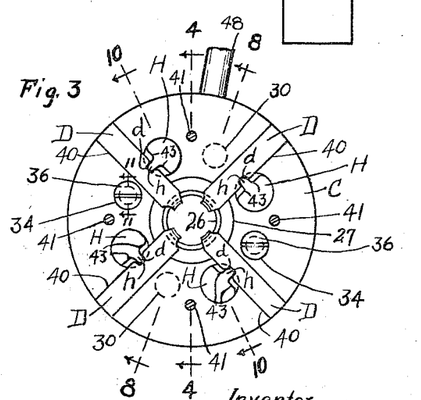
Fig. 3 is a vertical section taken transversely through the cutter-head along the line 3—3, Fig. 1, looking rearwardly.
Figure 6:
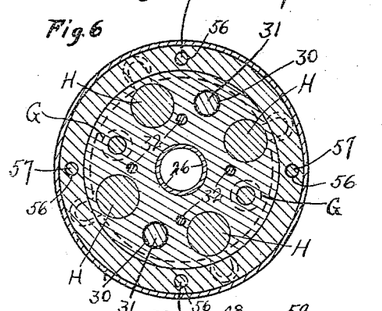
Fig. 6 is a transverse vertical section taken along the line 6—6, Fig. 4, looking forwardly.
Figure 7:
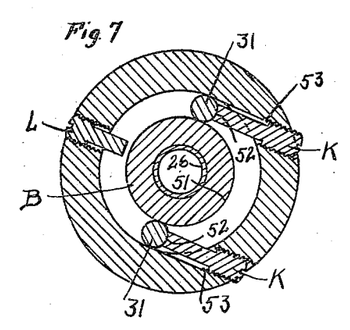
Fig. 7 is a transverse vertical section taken along the line 7—7, Fig. 4, looking rearwardly.
Figure 11:
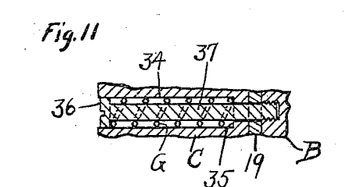
Fig. 11 is a vertical section, in detail, taken along the line 11—11, Fig. 3.

The cutter-head (see Figs. 3, 6 and 8) is provided with two holes 30 which are formed in the rear portion of the cutter-head and extend endwise of and through the body C of the cutter-head and through the rear end plate 19 of the cutter-head, and said holes are arranged horizontally and parallel with the central bore 27 in the cutter-head and spaced from and circumferentially of said bore. Each hole 30 is loosely engaged by a correspondingly horizontally arranged pin 31 which projects forwardly from and is tightly fitted in and consequently rigid with the body B of the stock. It will be observed therefore that the body B of the stock is provided with two pins 31 projecting forwardly from the stock into the cutter-head and spaced from and circumferentially of the central bore 27 in the cutter-head, that the cutter-head is slidably mounted on said pins and normally in its rearward position in which the rear end plate 19 of the cutter-head abuts against the forward end of the stock. Said plate 19 of the cutter-head is shown secured to the body C of the cutter-head preferably removably by screws 32. Any shifting of the cutter-head forwardly from the stock is against the action of spiral springs G shown in Figs. 3, 6 and 11 and yieldingly holding the cutter-head rearwardly against the stock. Preferably the cutter-head is provided with two horizontal bores 34 rearward of the forward end plate 18 of the cutter-head, and said bores extend endwise of and through the body C of the cutter-head and through the rear end plate 19 of the cutter-head and are parallel with the holes 30 and central bore 27 and arranged externally and spaced circumferentially of said central bore. Each bore 34 has its rear end-portion smaller diametrically than the remainder of the bore to form a forwardly facing annular shoulder 35 spaced rearwardly from the head 36 of a screw 37 extending endwise of and through said bore and loosely through the rearward end plate 19 of the cutter-head and screwed into and therefore rigid with the body B of the stock. On each screw 37 is mounted a spiral spring G confined between the head 36 of said screw and the adjacent shoulder 35, which spring is normally under tension so as to act to retain the cutter-head in its rearward and normal position.

The forward portion of the body C of the cutter-head is larger in external diameter than the remainder of said body so as to form a rearwardly facing annular shoulder 38 arranged concentrically relative to the central bore 27 in the cutter-head, and said forward portion of said body is provided at its forward end (see Figs. 1 and 3) with four slots or guideways 40 which are spaced equidistantly circumferentially of said bore. Each guideway 40 extends from said bore 27 to the exterior of the cutter-head and is engaged by a cutter D, and the cutters extend into the forwardly flaring forward end-portion 28 of said bore. Each cutter D has its teeth formed at its inner end in any approved manner and is adjustable or shiftable radially of the cutter-head. Each guideway 40 has its rearwardly facing forward wall formed by the forward end plate 18 of the cutter-head, and said plate overlaps each cutter and is secured in place removably by screws 41.

Figures 12, 15:
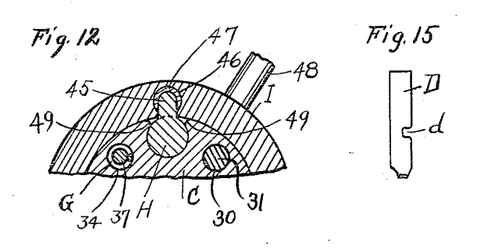
Fig. 12 is a transverse vertical section taken along the line 12—12, Fig. 10, looking forwardly.
Fig. 15 is a forward edge view of a cutter detached.
Figure 16:
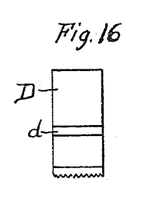
Fig. 16 is a right-hand side elevation relative to Fig. 15. Portions are broken away in said drawings to reduce the size of the drawings.

Each cutter D (see Figs. 3, 15 and 16) is provided in one side and centrally between the ends thereof with a recess $d$ which extends transversely of and horizontally through said cutter and is engaged by a tooth $h$ formed on a horizontally arranged shaft H which extends transversely of the cutter and between the end plates 18 and 19 of the cutter-head and consequently endwise of the cutter-head. Said shaft has bearing in the cutter-head and preferably extends through the rear end plate 19 of the cutter-head. Preferably the aforesaid tooth is formed by the partition or wall between two recesses 43 which are formed in the forward end-portion of said shaft, and said recesses are spaced circumferentially of the shaft and extend rearwardly from the forward extremity of the shaft a distance measuring at least as much as the width of the associated cutter. Obviously by the formation of said tooth by the wall between said recesses the forward end-portion or toothed portion of said shaft is not any larger in diameter than the remainder of the shaft and does not interfere with the insertion of said shaft into the cutter-head from the rear end of the body of the cutter-head. It will also be observed that said tooth pushes laterally against the one or the other side wall of the engaging recess $d$ in the associated cutter, and consequently said cutter is actuated inwardly or outwardly, according as the shaft is rotated in the one or the other direction.

Figure 13:
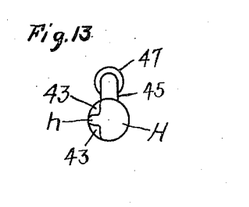
Fig. 13 is a forward end view of a cutter-operating shaft detached and shows the associated bushing on the arm of said shaft.
Figure 14:
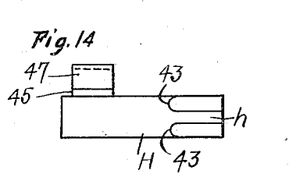
Fig. 14 is a left-hand side view relative to Fig. 13.

Means for rotating the cutter-actuating shafts H simultaneously and in unison are provided and comprise a ring I rotatably mounted on the rear end-portion of the body C of the cutter-head between the shoulder 38 and the rear end plate 19 of the cutter-head, and said plate is shown overlapping the rear end face of said ring. The shafts H and the ring I have their axes parallel, and each shaft H has its rear end-portion (see Figs. 10 and 12) provided, next forward of the rear end plate of the cutter-head, with an arm 45 which projects outwardly into a recess 46 formed in said ring at the internal surface of the ring and extending forwardly from the rear extremity of the ring. Said arm is loosely embraced by a bushing 47 which is U-shaped and externally circular in cross-section and has bearing in the ring I and has its axis parallel with the axis of the ring. By the construction hereinbefore described it will be observed that the ring I is confined next forward of the rear end plate 19 of the cutter-head endwise of the cutter-head, that said ring is provided internally with recesses spaced circumferentially of the cutter-head, that the hereinbefore mentioned bushings engage said recesses and are rotatably mounted in said ring and flush at their rear end faces with the rear end face of said ring, that the shafts are arranged within the cutter-head adjacent said bushings and have their arms 45 next forward of said plate of the cutter-head, and that said plate overlaps said arms and the rear end faces of the bushings and therefore constitutes means for preventing rearward displacement of the bushings and shafts. The operative connection between each shaft H and the ring I is formed by the arm 45 of said shaft and the adjacent bushing 47, and the relative arrangement of the parts is such that said arm extends into said bushing in either extreme position of the cutter associated with said shaft. Obviously all of the shafts are simultaneously operated during the rotation of the ring I, and as the arms of all of the shafts project outwardly into said ring said shafts are rotated in the same direction during the rotation of the said ring in one direction, and the shafts are rotated in the one direction or the other according as said ring is rotated in the one or the other direction. The relative arrangement of each shaft and the cutter operatively connected or associated with said shaft corresponds with the relative arrangement of each other cutter and associated shaft so that all of the cutters are simultaneously and correspondingly actuated endwise outwardly or inwardly according as the ring I is rotated in the one or the other direction. It will be observed that in my improved operative connection between the ring I and the shafts H friction is reduced to a minimum, that the component parts of the operative connection between said ring and the cutters are readily assembled, that the bushings are readily renewable and that the construction is simple and durable. The ring I is provided with a handle 48 for rotating the ring, and the body C of the cutter-head is cut away, as at 49, Fig. 12, adjacent the arm 45 of each shaft H to permit the required limited rotation of said shaft. Of course, the shafts H preferably correspond in dimensions and are spaced equidistantly from and equidistantly circumferentially of the central bore 27 in the cutter-head. A shaft H and the bushing 47 on the arm of said shaft are shown detached in Figs. 13 and 14. The cutters are shown in their inner position ready for the reception between them of the work, such, for instance, as a rod, screw-blank or other object 23 upon which screw-threads are to be cut by the cutters. A cutter D is shown detached in Figs. 15 and 16. In assembling the parts obviously the shafts H, upon mounting the bushings 47 on the arms of the shafts, are inserted into place from the rear end of the body of the cutter-head after the application of the ring I and preparatory to the application of the rear end plate 19 of the cutter-head.

The stock (see Figs. 1, 4, 7, 8 and 10)

also comprises a circular collar 50 which is loosely mounted on and adjustable circumferentially of the body B of the stock. The collar 50 is concentric relative to the ring I, and constitutes the outer portion of the stock. The body B of the stock is provided with an external annular recess 51 which extends circumferentially of said body and is concentric relative to the collar 50. The pins 31 of said body B extend into and transversely of the recess 51 and have their recess-engaging portions forming two shoulders 52 which are arranged between the side walls and extend transversely of said recess and face laterally of the stock in the same direction and are spaced circumferentially of said body. One of the shoulders 52 is engaged by the inner end of one screw of a pair of parallel screws K, and the other of said shoulders is engaged by the inner end of the other of the said screws. Said screws engage and extend through correspondingly arranged and correspondingly screw-threaded holes 53 formed in the collar 50 and coöperate with the shoulders 52 in constituting means for securing the collar in the desired adjustment circumferentially of the body B of the stock, and obviously said collar is readjusted circumferentially of said body by the required manipulation of said screws. By the construction hereinbefore described it will be observed that the screws K are threaded into the collar 50 at one side of the stock and opposite the shoulders 52 and extend into the recess 51 in the body B of the stock and form abutments for said shoulders. Another screw L is threaded into the collar 50 at the opposite side of the stock and extends into said recess 51, and the width of said recess is such relative to the diameter of the recess-engaging portions of the screws K and L that opposite side walls of said recess are arranged in close proximity to opposite sides respectively of said screws and coöperate with said screws in constituting means for preventing displacement of said collar endwise of the body of the stock.

The collar 50 (see Figs. 4, 6, 8 and 10) is provided at its forward end with a forwardly projecting annular flange 55 which is concentric relative to said collar and consequently concentric relative to the ring I and extends circumferentially of and loosely embraces the rear end plate 19 of the cutter-head.

Figure 9:
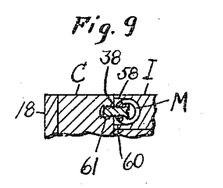
Fig. 9 is a section, in detail, taken along the line 9—9, Fig. 5.

Said flange 55 is provided at its forward end face with several holes 56 spaced equidistantly circumferentially of the plate 19, and consequently circumferentially of the body of the stock. Each hole 56 is engaged by a horizontally arranged pin 57 with which the ring I is provided. That is, said ring carries as many pins 57 as there are holes 56 in the flange 55 of the collar 50, and said pins are parallel with the axis of the ring. Preferably said ring (see Figs. 4 and 5) is provided at its forward end face with an annular recess 58 arranged concentrically relative to said ring, and said ring is shown provided at its rear end with a rearwardly projecting annular flange 59 loosely embracing the flange 55 of the collar 50. The pins 57 extend from within the recess 58 rearwardly and beyond the rear end of the ring I and into the holes 56 in the flange 55 of the collar 50 and are removable from said collar as will hereinafter appear. The pins 57 are rigid with the ring I and coöperate with the flange 55 of the collar 50 of the stock in locking said ring to the stock against rotation on the body C of the cutter-head, but obviously said ring is rendered free to rotate on the cutter-head upon the movement of said ring with the cutter-head far enough forwardly from the stock to render said pins inoperative by removing or disengaging them from the holes 56 in said flange 55. Obviously a rotation of the ring I on the cutter-head in the direction indicated by the arrow 60 in Fig. 5, upon the forward movement of the cutter-head from the stock the extent required to unlock said ring from the stock, effects the rotation of the shafts H in the direction required to result in the outward actuation of the cutters D from their inner and thread-cutting position into their outer and work-releasing position. Suitably applied springs M, arranged within the recess 58 in the ring I and spaced and extending circumferentially of the cutter-head and normally under tension, act to rotate said ring in the direction indicated by the arrow 60, Fig. 5. Preferably to the forward end of each pin 57 is attached one end of a spring M which extends from said pin circumferentially of the cutter-head in the direction indicated by said arrow 60 and is attached at its opposite end by a screw 61 (see Figs. 5 and 9) to the body C of the cutter-head. It will be observed therefore that the springs M constitute resilient means acting to rotate the ring I in the direction required to withdraw the cutters from their operative position, that my improved screw-thread-cutting device comprises means whereby said ring is locked against rotation, and said locking means is adapted to be rendered inoperative by a shifting of said ring with the cutter-head forwardly from the stack the required extent.

The outer circumferential surface of the ring I is provided adjacent the forward end of the ring (see Fig. 1) with a line or mark 62 with coöperates with a scale 63 formed on the adjacent portion of the outer circumferential surface of the body C of the cutter-head in indicating the adjustment or position of the cutters.

It will also be observed that 65 in Fig. 1 indicates a lug formed on the bed A and arranged to limit movement of the work-feeding head E toward my improved screw-thread-cutting device. The relative arrangement of the parts is such that, when the work 23 has been fed by said work-feeding head into position to be operated on by the cutters D and rotated while being operated on by said cutters, the stop 65 will arrest the endwise movement of the work near the end of the operation on the work by said cutters, whereupon the rotating work, having said movement thereof arrested, will pull the connected cutter-head, and consequently the ring I, forwardly toward the work-feeding head, and the relative arrangement of the parts is furthermore such that when the cutters have completed their thread cutting operation on the work the ring I shall have been shifted forwardly far enough to have removed its pins 57 from the holes 56 in the collar 50 of the stock so as to release or unlock said ring from the stock and render said ring subject to the action of the springs M and permit said springs to rotate said ring in the direction required to effect the actuation of the cutters outwardly and thereby cause the cutters to withdraw from and release the work.

What I claim is:—

1. In a device for cutting screw-threads, a cutter-head provided in its forward portion with guideways arranged substantially radially of the cutter-head, cutters engaging the guideways and each provided in one side thereof with a recess extending transversely of the respective cutter, a shaft associated with each cutter and extending transversely and rearwardly of the cutter and having bearing in the cutter-head, and a ring rotatably mounted on the cutter-head and operatively connected with the shafts, each shaft being provided in its forward end-portion with two recesses which extend longitudinally and are spaced circumferentially of the shaft and having the wall or partition between said recesses forming a tooth which engages the recess in the cutter associated with said shaft, and the cutters being adapted to be shifted outwardly or inwardly according as the aforesaid ring is rotated in the one or the other direction.

2. In a screw-thread-cutting device, a cutter-head provided with guideways arranged substantially radially of the cutter-head, cutters engaging the guideways and each provided in one side thereof with a recess extending transversely of and through the respective cutter, a shaft associated with each cutter and extending transversely and rearwardly of the cutter and having bearing in the cutter-head, and a ring rotatably mounted on the cutter-head and operatively connected with the shafts, each shaft being provided in its forward end-portion with two recesses which are spaced circumferentially of the shaft and having the partition between said recesses forming a tooth which engages the recess in the cutter associated with said shaft, the cutters being adapted to be simultaneously shifted outwardly or inwardly according as the aforesaid ring is rotated in the one or the other direction, and the aforesaid recess in each shaft extending rearwardly from the forward extremity of the shaft a distance measuring at least as much as the width of the cutter associated with said shaft.

3. In a screw-thread-cutting device, a cutter-head provided with guideways which are arranged substantially radially of the cutter-head and comprising a body and two end plates arranged to form the forward end face and rear end face respectively of the cutter-head and removably secured to said body, cutters engaging the guideways, shafts operatively connected with the cutters and extending between the end plates of the cutter-head and into the rear end plate of the cutter-head, and a ring rotatably mounted on the body of the cutter-head and operatively connected with the shafts, the cutters being adapted to be simultaneously shifted outwardly or inwardly according as said ring is rotated in the one or the other direction, the shafts having bearing in the cutter-head, and the aforesaid rear end plate overlapping the rear end face of said ring.

4. In a screw-thread-cutting device, a cutter-head provided with guideways arranged substantially radially of the cutter-head, cutters engaging the guideways, a ring rotatably mounted on the cutter-head and provided internally with recesses spaced circumferentially of the cutter-head, bushings engaging said recesses and rotatably mounted in said ring, and shafts arranged within the cutter-head adjacent said bushings and extending endwise of and having bearing in the cutter-head, said shafts being operatively connected with the cutters and provided with arms extending into and being loose relative to said bushings, the cutters being adapted to be simultaneously shifted outwardly or inwardly according as the aforesaid ring is rotated in one or the other direction, the arms of the shafts projecting into the bushings in either extreme position of the cutters, and the bushings, the shafts and the ring having their axes parallel.

5. In a screw-thread-cutting device, a cutter-head provided in its forward portion with guideways which are arranged substantially radially of the cutter-head and comprising a body having an external rearwardly facing shoulder which is spaced forwardly from the rear extremity of the cutter-head and also comprising a plate arranged to form the rear end face of the cutter-head, cutters engaging the guideways, a ring rotatably mounted on the cutter-head between said plate and the aforesaid shoulder and provided internally with recesses spaced circumferentially of the cutter-head and extending forwardly from the rear end face of the ring, bushings engaging said recesses and rotatably mounted in said ring and flush at their rear end faces with the rear end face of the ring, and shafts extending endwise of and having bearing in the cutter-head, said shafts being operatively connected with the cutters and provided at their rear ends with arms extending into and being loose relative to said bushings, the cutters being adapted to be simultaneously shifted outwardly or inwardly according as the aforesaid ring is rotated in the one or the other direction, and the aforesaid plate overlapping the rear end faces of the bushings.

6. In a screw-thread-cutting device, a cutter-head provided in its forward portion with guideways which are arranged substantially radially of the cutter-head and comprising a body and an end plate arranged to form the rear end face of the cutter-head, cutters engaging the guideways, a ring rotatably mounted on the aforesaid body and provided internally with recesses spaced circumferentially of the cutter-head and extending forwardly from the rear end of the ring, bushings engaging said recesses and rotatably mounted in the ring, and shafts extending endwise of and having bearing in the cutter-head, said shafts being operatively connected with the cutters and provided next forward of the aforesaid plate with arms extending into and being loose relative to said bushings, the cutters being adapted to be simultaneously shifted outwardly or inwardly according as the aforesaid ring is rotated in the one or the other direction, the arms of the shafts projecting into the bushings in either extreme position of the cutters, the aforesaid plate overlapping the rear end face of said ring and the rear end faces of the bushings, and the bushings, the ring and the shafts having their axes parallel.

7. In a screw-thread-cutting device, a stock, a cutter-head forward of and supported and shiftable forwardly from the stock and provided with guideways arranged substantially radially of the cutter-head, cutters engaging the guideways, a ring rotatably mounted on the cutter-head, shafts extending endwise of and having bearing in the cutter-head and being operatively connected with the cutters and with the aforesaid ring, resilient means acting to rotate said ring in the direction required to withdraw the cutters from their operative position, and means whereby said ring is locked against rotation to the stock, the cutters being adapted to be simultaneously shifted outwardly or inwardly according as said ring is shifted in the one or the other direction, and the aforesaid locking means being adapted to be rendered inoperative by the required shifting of the ring with the cutter-head forwardly from the stock.

8. In a screw-thread-cutting device, a stock, a cutter-head forward of and supported and shiftable forwardly from the stock and provided with guideways arranged substantially radially of the cutter-head, cutters engaging the guideways, a ring rotatably mounted on the cutter-head, shafts extending endwise of and having bearing in the cutter-head and operatively connected with the cutters and with said ring and having their axes parallel with the axis of the ring, spiral springs acting to rotate said ring in the direction required to withdraw the cutters from their operative position, and means whereby said ring is locked against rotation, said locking means being adapted to be rendered inoperative by a shifting of the ring with the cutter-head forwardly the required extent from the stock, the cutters being adapted to be simultaneously shifted outwardly or inwardly according as said ring is rotated in the one or the other direction, said ring being provided at its forward end with an annular recess extending circumferentially of the cutter-head, and the aforesaid springs being arranged within said recess and circumferentially of the cutter-head and attached at one end to the cutter-head and at the other end to the ring.

9. In a screw-thread-cutting device, a stock having a circular body and comprising a collar mounted on and adjustable circumferentially of said body, means for securing said collar in the desired adjustment, a cutter-head forward of and supported and shiftable forwardly from the aforesaid body of the stock and provided in its forward portion with guideways arranged substantially radially of the cutter-head, cutters engaging the guideways, a ring rotatably mounted on the cutter-head and confined endwise of the cutter-head, shafts extending endwise of and having bearing in the cutter-head and operatively connected with the cutters and with said ring, resilient means acting to rotate said ring in the direction required to withdraw the cutters from their operative position, and means normally locking said ring to the aforesaid collar, said locking means being adapted to be rendered inoperative by a shifting of said ring with the cutter-head forwardly from the stock the required extent.

10. In a screw-thread-cutting device, a stock having a circular body and comprising a collar mounted on and adjustable circumferentially of said body, means for securing said collar in the desired adjustment, a cutter-head forward of and supported and shiftable forwardly from the aforesaid body of the stock and provided in its forward portion with guideways arranged substantially radially of the cutter-head, cutters engaging the guideways, a ring rotatably mounted on the cutter-head and confined endwise of the cutter-head, shafts extending endwise of and having bearing in the cutter-head and operatively connected with the cutters and with the aforesaid ring, and resilient means acting to rotate said ring in the direction required to withdraw the cutters from their operative position, said ring and the aforesaid collar being provided the one with pins and the other with holes normally engaged by said pins so as to lock said ring to said collar, and said pins being disengaged from said holes by a shifting of said ring with the cutter-head forwardly the required extent.

11. In a screw-thread-cutting device, a stock having a body and comprising a collar mounted on and adjustable circumferentially of said body, means for securing said collar in the desired adjustment, a cutter-head forward of and supported and shiftable forwardly from said body and provided in its forward portion with guideways arranged substantially radially of the cutter-head, cutters engaging the guideways, a ring rotatably mounted on and being carried by the cutter-head, shafts extending endwise of and having bearing in the cutter-head and operatively connected with the cutters and with said ring, resilient means acting to rotate said ring in the direction required to withdraw the cutters from their operative position, and pins carried by said ring and extending into the aforesaid collar and normally locking said ring to said collar and being adapted to be withdrawn from said collar by movement of the cutter-head forwardly from the stock the required extent.

12. In a screw-thread-cutting device, a stock having a body and comprising a collar mounted on and adjustable circumferentially of said body, means for securing said collar in the desired adjustment, a cutter-head forward of and supported and shiftable forwardly from said body and provided in its forward portion with guideways arranged substantially radially of the cutter-head, cutters engaging the guideways, a ring rotatably mounted on and carried by the cutter-head and operatively connected with the cutters and provided at its forward end face with a recess extending circumferentially of the cutter-head, pins carried by said ring and spaced circumferentially of the cutter-head and normally projecting into the aforesaid collar and locking said ring to said collar and adapted to be withdrawn from said collar by movement of the cutter-head forwardly from the stock the required extent, and spiral springs arranged within the aforesaid recess and circumferentially of the cutter-head, each spring being attached at one end to one of the aforesaid pins and at its other end to the cutter-head and acting to rotate the aforesaid ring in the direction required to withdraw the cutters from their operative position.

13. In a screw-thread-cutting device, the combination, with a stock having a circular body which is provided with an external circumferentially extending recess and comprising a collar mounted on and adjustable circumferentially of said body, a cutter-head forward of and supported and movable forwardly from the stock and having substantially radially arranged guideways, a ring rotatably mounted on and carried by the cutter-head, cutters operatively connected with said ring and engaging the aforesaid guideways, resilient means acting to rotate said ring in the direction required to withdraw the cutters from their operative position, and locking means normally locking said ring to the aforesaid collar and adapted to be rendered inoperative by movement of the cutter-head forwardly from the stock the required extent, and the body of the stock having two shoulders arranged between the side walls of the aforesaid recess and spaced circumferentially of said body, of several screws threaded into the aforesaid collar and extending into said recess and spaced circumferentially of said body, two of said screws being arranged to coöperate with said shoulders in securing said collar in the desired circumferential adjustment, and the width of said recess being such relative to the diameter of the recess-engaging portions of the screws that the side walls of said recess coöperate with the screws in preventing endwise displacement of said collar.

14. In a screw-thread-cutting device, a stock having a body and comprising a collar mounted on and adjustable circumferentially of said body, means for securing said collar in the desired circumferential adjustment, a cutter-head forward of and supported and movable forwardly from the body of the stock and having substantially radially arranged guideways and comprising a plate which forms the rear end face of the cutter-head and is larger diametrically than the adjacent portion of the body of the cutter-head, resilient means acting to retain the cutter-head in its rearward and normal position, a ring rotatably mounted on the cutter-head next forward of the aforesaid plate, cutters operatively connected with said ring and engaging the aforesaid guideways, and resilient means acting to rotate said ring in the direction required to withdraw the cutters from their operative position, the aforesaid collar having a flange loosely embracing and extending circumferentially of the aforesaid plate and arranged concentrically relative to said ring, said ring and said flange being provided the one with holes and the other with pins engaging said holes, and said pins being arranged to become disengaged from said holes upon the required movement of the cutter-head forwardly from the stock.

In testimony whereof, I sign the foregoing specification, in the presence of two witnesses.

THOMAS SHEHAN.

Witnesses:
CASPER J. DORER,
EMIL W. KRYZ.